United States Patent
Cheshire

(10) Patent No.: US 7,757,108 B2
(45) Date of Patent: *Jul. 13, 2010

(54) METHOD AND APPARATUS FOR IMPLEMENTING A SLEEP PROXY FOR SERVICES ON A NETWORK

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/959,015

(22) Filed: Dec. 18, 2007

(65) Prior Publication Data

US 2008/0098241 A1    Apr. 24, 2008

Related U.S. Application Data

(63) Continuation of application No. 11/581,866, filed on Oct. 16, 2006, now Pat. No. 7,330,986, which is a continuation of application No. 11/483,750, filed on Jul. 10, 2006, now Pat. No. 7,246,225, which is a continuation of application No. 10/676,573, filed on Sep. 30, 2003, now Pat. No. 7,107,442.

(60) Provisional application No. 60/496,842, filed on Aug. 20, 2003.

(51) Int. Cl.
*G06F 13/173* (2006.01)

(52) U.S. Cl. ................ 713/320; 713/300; 713/310; 713/321; 713/322; 713/323; 713/324; 713/330; 713/40; 709/203; 709/224

(58) Field of Classification Search .......... 713/300, 713/310, 320–324, 330, 340; 709/203, 224
See application file for complete search history.

(56) References Cited

U.S. PATENT DOCUMENTS

| | | | |
|---|---|---|---|
| 4,661,902 | A | 4/1987 | Hochsprung |
| 4,689,786 | A | 8/1987 | Sidhu |
| 5,150,464 | A | 9/1992 | Sidhu et al. |
| 5,282,270 | A | 1/1994 | Oppenheimer et al. |
| 5,388,213 | A | 2/1995 | Oppenheimer |
| 5,745,699 | A | 4/1998 | Lynn |

(Continued)

FOREIGN PATENT DOCUMENTS

EP    0777172 A1    11/1996

*Primary Examiner*—Abdelmoniem Elamin
(74) *Attorney, Agent, or Firm*—Park, Vaughan & Fleming LLP

(57) ABSTRACT

One embodiment of the present invention provides a system for implementing a sleep proxy. The system starts by receiving a request at the sleep proxy for information pertaining to a service provided by a device. In response to this request, the system determines if the device is a member of a list of devices for which the sleep proxy takes action. If so, the system determines if the sleep proxy can answer the request. If so, the sleep proxy sends a response to the request on behalf of the device. In a variation on this embodiment, if the system cannot answer the request on behalf of the device, the system sends a wakeup packet to the device, wherein the wakeup packet causes the device to exit a power-saving mode so that the device can respond to the request directly.

27 Claims, 2 Drawing Sheets

U.S. PATENT DOCUMENTS

| | | |
|---|---|---|
| 5,835,719 A | 11/1998 | Gibson |
| 5,884,322 A | 3/1999 | Sidhu |
| 5,915,119 A | 6/1999 | Cone |
| 6,101,608 A | 8/2000 | Schmidt |
| 6,366,957 B1 | 4/2002 | Na |
| 6,445,678 B1 | 9/2002 | Bard |
| 6,694,360 B1 | 2/2004 | Duguay |
| 6,754,844 B1 | 6/2004 | Mitchell |
| 6,990,515 B2 | 1/2006 | Cromer |
| 6,993,670 B2 | 1/2006 | Weng |
| 7,107,442 B2 * | 9/2006 | Cheshire ............. 713/1 |
| 7,246,225 B2 * | 7/2007 | Cheshire ............. 713/1 |
| 7,330,986 B2 * | 2/2008 | Cheshire ........... 713/320 |
| 2002/0083172 A1 * | 6/2002 | Knowles et al. ...... 709/225 |
| 2005/0235360 A1 | 10/2005 | Pearson |

* cited by examiner

METHOD AND APPARATUS FOR IMPLEMENTING A SLEEP PROXY FOR SERVICES ON A NETWORK

RELATED APPLICATION

The present patent is a continuation of U.S. patent application Ser. No. 11/581,866, filed on 16 Oct. 2006, now U.S. Pat. No. 7,330,986, which is itself a continuation of U.S. Pat. No. 7,246,225 (application Ser. No. 11/483,750, filed on 10 Jul. 2006), which itself is a continuation of U.S. Pat. No. 7,107,442 (application Ser. No. 10/676,573, filed on 30 Sep. 2003), which claims priority to U.S. Provisional Patent Application No. 60/496,842, filed on 20 Aug. 2003. The present application claims priority under 35 U.S.C. §120 to the above-listed U.S. patent Applications and under 35 U.S.C. §119 to the above-listed U.S. Provisional Patent Application.

BACKGROUND

1. Field of the Invention

The present invention relates to computer networks. More specifically, the present invention relates to a method and an apparatus for implementing a sleep proxy for services on a network.

2. Related Art

In recent years, a large number of devices, such as printers, have been brought to the marketplace bearing various logos indicating that the device meets some sort of energy saving standard. At the same time, an increasing number of these devices are being attached to computer networks to allow workgroups to utilize their services. In order for these devices to be able to perform their services on the network, they need to be able to respond to requests on the network. However, many of these devices enter a power-saving mode when they have not been used for a specified amount of time. In order to restore the device to a normal operating mode, a packet can be sent to the device that contains a specific bit sequence that will "wake up" the device. This packet is commonly referred to as a "magic packet" or "wakeup packet" and the technology as a whole is referred to as "wake-on-LAN."

Power-saving modes can become a problem because the device typically will not respond to a request when it is in power-saving mode, and clients typically do not know the bit sequence of the magic packet that will cause the device to turn on. Hence, if the device is in a power-saving mode, it will not answer a request for a service provided by the device on the network, and therefore will appear offline to clients on the network.

In many cases, the user must manually walk over to the device and press a button to wake it up, or they simply may not be able to use the device at all. Moreover, a user may not even know of the existence or availability of a device if it is in power-saving mode. When devices are in power-saving mode, they do not broadcast their services on the network, and therefore may not show up in a list of available services. This is especially true if the device has been in power-saving mode for an extended period of time.

Hence, what is needed is a method and an apparatus for allowing the device to enter into a power-saving mode while still maintaining visibility and availability on the network.

SUMMARY

One embodiment of the present invention provides a system for implementing a sleep proxy. The system starts by receiving a request at the sleep proxy for information pertaining to a service provided by a device. In response to this request, the system determines if the device is a member of a list of devices for which the sleep proxy takes action. If so, the system determines if the sleep proxy can answer the request. If so, the sleep proxy sends a response to the request on behalf of the device.

In a variation on this embodiment, if the system cannot answer the request on behalf of the device, the system sends a wakeup packet to the device, wherein the wakeup packet causes the device to exit a power-saving mode so that the device can respond to the request directly.

In a variation on this embodiment, prior to receiving the request, the system receives a registration from the device, wherein the registration contains sufficient information to allow the sleep proxy to generate a wakeup packet that causes the device to wake up, and the list of requests for which the sleep proxy can answer. The system then adds the device to the list of devices for which the sleep proxy answers.

In a further variation, the registration additionally contains a lease expiration time, wherein upon reaching the lease expiration time, the sleep proxy cancels the device registration.

In yet a further variation, an internal timer in the device wakes up the device so that the device can renew its registration with the sleep proxy before the registration expires.

In a variation on this embodiment, the system receives a notification from the device that the device is entering a power-saving state. In response to this notification, the system configures the sleep proxy to answer for the device.

In a variation on this embodiment, the system receives a notification from the device that the device has exited a power-saving state. In response to this notification, the system configures the sleep proxy not to answer for the device.

In a variation on this embodiment, for fault-tolerance purposes, the system contains a second sleep proxy that mirrors the functionality of the sleep proxy.

In a further variation, the system waits a random period of time before answering for the device. This allows for duplicate answer suppression for multiple sleep proxies.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network

Figure 1:
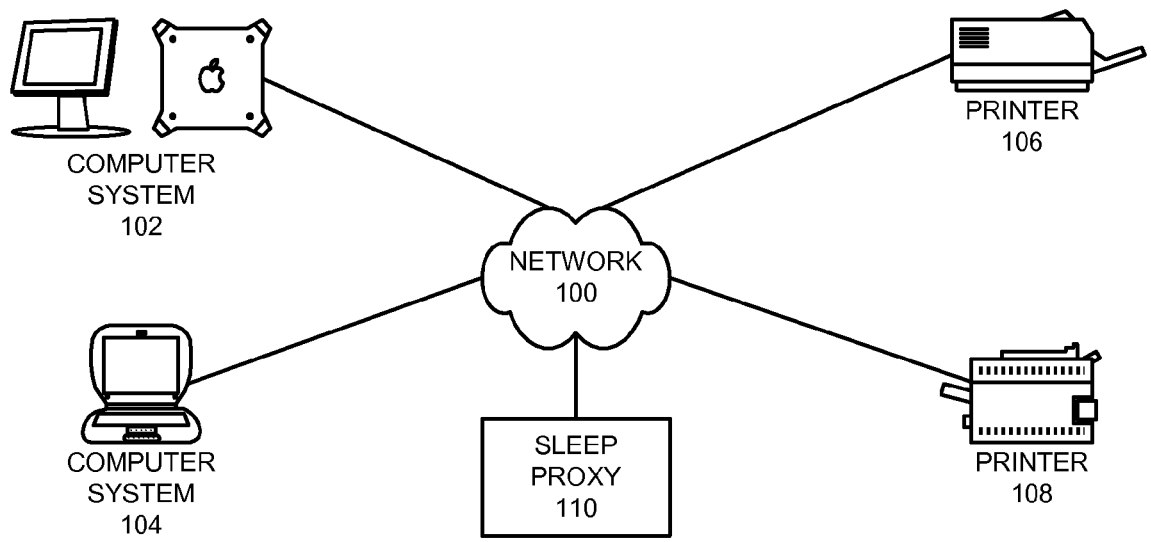
FIG. 1 illustrates a computer network in accordance with an embodiment of the present invention.

FIG. 1 illustrates a computer network 100 in accordance with an embodiment of the present invention. Network 100 can generally include any type of wire or wireless communication channel capable of coupling together computing nodes. This includes, but is not limited to, a local area network, a wide area network, or a combination of networks. In one embodiment of the present invention, network 100 includes the Internet.

Network 100 includes computer systems 102 and 104, printers 106 and 106, and sleep proxy 110. Computer systems 102 and 104 can generally include any type of computer system, including, but not limited to, a computer system based on a microprocessor, a mainframe computer, a digital signal processor, a portable computing device, a personal organizer, a device controller, and a computational engine within an appliance.

In one embodiment of the present invention, the devices on network 100 adhere to a plug-and-play protocol, such as Apple Computer, Inc.'s Rendezvous technology. During operation, printers 106 and 108 self-configure to network 100 and advertise their services via broadcast messages to all nodes on network 100.

Sleep Proxy 110 can be included in any type of device on network 100. Preferably, sleep proxy 110 should be a device that is always connected to the network and is always in a full-power state. Some exemplary locations for sleep proxy 110 are within hubs, switches, and wireless access points, since such devices are usually always connected and always in a full-power state.

Sleep Proxy

Figure 2:
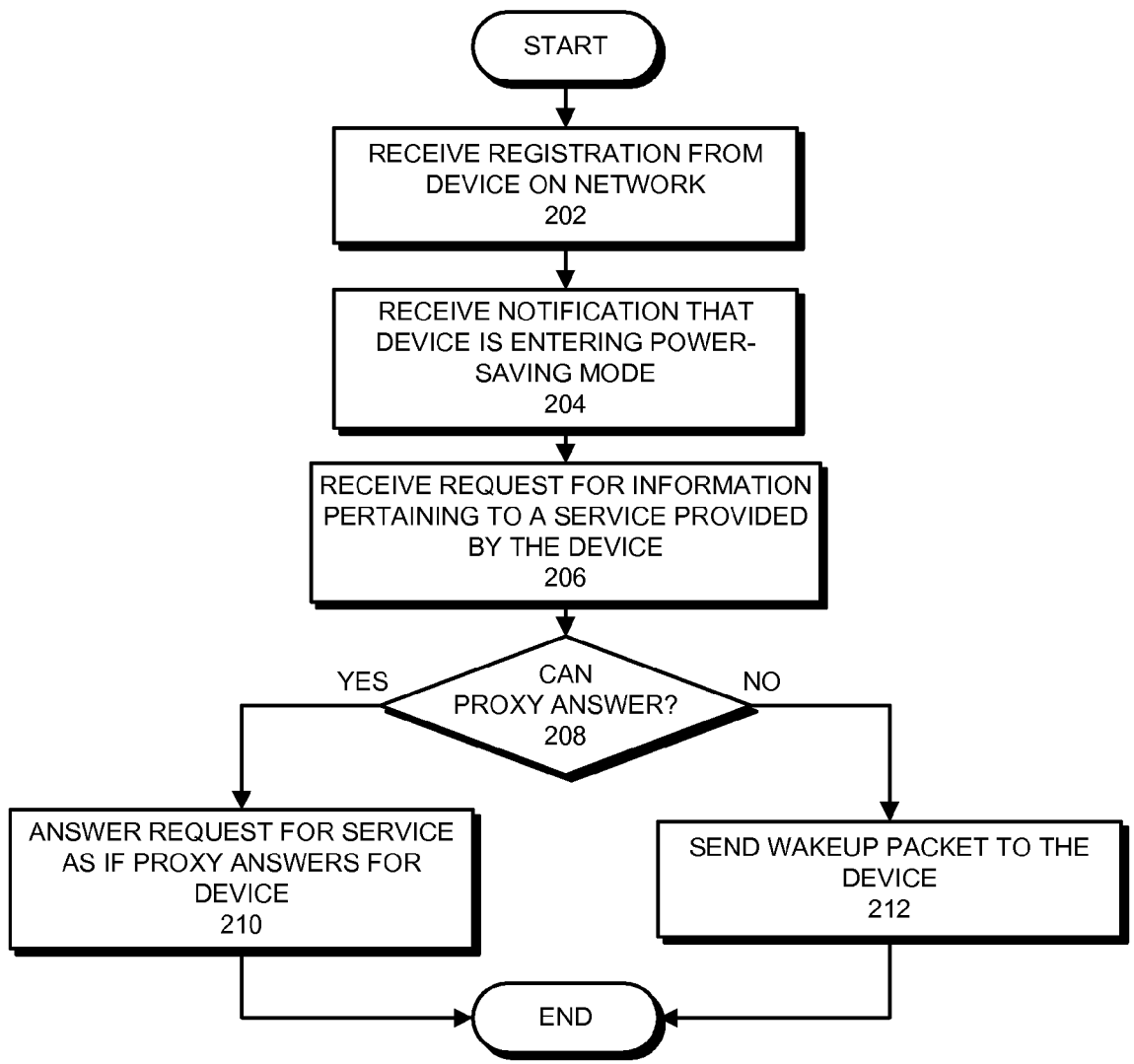
FIG. 2 presents a flowchart illustrating the process of a sleep proxy in accordance with an embodiment of the present invention.

FIG. 2 presents a flowchart illustrating the operation of a sleep proxy 110 in accordance with an embodiment of the present invention. The system starts when sleep proxy 110 receives a registration request from a device on network 100, such as printer 108 (step 202). For example, printer 108 can send sleep proxy 110 a registration request specifying information pertaining to services that it provides, as well as which of that information that sleep proxy 110 should answer for. In particular, information that sleep proxy 110 might answer for printer 108 can include host name, host address, port number, current status, and types of services available. All of these examples are situations where a client, such as computer system 102, is requesting information only and is not requesting the device to perform an action besides providing the basic information. By answering for printer 108, sleep proxy 110 allows printer 108 to continue to be listed as an available resource on the network while allowing printer 108 to stay in a power-saving state. Printer 108 also sends sleep proxy 110 sufficient information to allow it to generate the magic packet that brings printer 108 out of a power-saving state. Note that this last step of sending sufficient information to allow the sleep proxy to generate the magic packet can be performed as printer 108 enters a power-saving state, described below.

Next, sleep proxy 110 receives a notification that printer 108 is entering a power-saving state (step 204). Note that this step may not be necessary as sleep proxy 110 can be configured to answer for printer 108 if it does not detect an immediate answer from printer 108. Upon receiving a request for information pertaining to a service provided by a device on network 100 (step 206), sleep proxy 110 determines if this is a request it can answer for the device (step 208). If so, sleep proxy 110 responds to the request as if it was the device that it is answering for (step 210). If not, sleep proxy 110 sends the magic packet to the device to bring the device out of a power-saving state (step 212). In this instance, it is not necessary for sleep proxy 110 to answer for the device because the requester, in accordance with customary network protocol design will retry the request several times before giving up. Sleep proxy 110 can also be configured to buffer the request for the device and to pass the request on to the device once the device has returned to a full power state. Upon exiting the power-saving mode, the device broadcasts a message to sleep proxy 110 on network 100 instructing sleep proxy 110 to cease answering for the device.

In some cases, it is beneficial for more than one sleep proxy to be operating on the same network to provide fault-tolerance. If sleep proxy 110 answers for printer 106, then a secondary sleep proxy will ignore the request. In cases where both sleep proxy 110 and a secondary sleep proxy answer for printer 106, the answer from the second sleep proxy can either be ignored, or can simply cause other devices on network 100 to update their local caches a second time. In one embodiment of the present invention, the sleep proxy waits for a random amount of time before answering a request in order to lessen the possibility of a duplicate answer.

In an example for this embodiment, multiple sleep proxies exist on a network, each having a registration for a specific printer that is in sleep mode. When a request for information pertaining to a service provided by that printer comes over the network, and the request is of the type that the sleep proxies are required to answer for the printer, each sleep proxy initiates a response to the request by waiting a random amount of time. At the point in time when the first sleep proxy broadcasts a reply to the request on the network, all remaining sleep proxies on the network will receive the response to the request and cancel their own pending response, thus saving network bandwidth.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a sleep proxy, comprising:
   receiving a request at the sleep proxy for information pertaining to a service provided by a device;
   determining if the device is a device for which the sleep proxy answers;
      if so, determining if the request is a request for which the sleep proxy can answer; and
         if so, sending a response to the request on behalf of the device;
         otherwise, buffering the request and passing the request to the device upon receiving a message to stop answering for the device.

2. The method of claim 1, wherein if the request is not a request for which the sleep proxy can answer, the method further comprises sending a wakeup packet to the device, wherein the wakeup packet is a packet that causes the device to exit a power-saving mode.

3. The method of claim 1, wherein prior to receiving the request, the method comprises:
   receiving a registration request from the device, wherein the registration request contains:

sufficient information to allow the sleep proxy to generate a wakeup packet that can wake up the device, and a list of requests for which the sleep proxy can answer; and adding the device to a list of devices for which the sleep proxy answers.

4. The method of claim 3, wherein the registration additionally contains a lease expiration time, wherein upon reaching the lease expiration time, the sleep proxy cancels the device registration.

5. The method of claim 4, wherein the device renews the registration with the sleep proxy before the registration expires.

6. The method of claim 1, further comprising:
receiving a notification from the device that the device is entering a power-saving state; and
in response to the notification, configuring the sleep proxy to answer for the device.

7. The method of claim 1, further comprising:
receiving a notification from the device that the device has exited a power-saving state; and
in response to the notification, configuring the sleep proxy not to answer for the device.

8. The method of claim 1, further comprising implementing a second sleep proxy that duplicates the functionality of the sleep proxy for fault-tolerance purposes.

9. The method of claim 1, wherein sending a response to the request further comprises waiting a random period of time prior to sending the response, wherein waiting the random period of time facilitates duplicate answer suppression between sleep proxies.

10. A computer-readable storage medium storing instructions that when executed by a computer cause the computer to perform a method for implementing a sleep proxy, the method comprising:
receiving a request at the sleep proxy for information pertaining to a service provided by a device;
determining if the device is a device for which the sleep proxy answers;
if so, determining if the request is a request for which the sleep proxy can answer; and
if so, sending a response to the request on behalf of the device;
otherwise, buffering the request and passing the request to the device upon receiving a message to stop answering for the device.

11. The computer-readable storage medium of claim 10, wherein if the request is not a request for which the sleep proxy can answer, the method further comprises sending a wakeup packet to the device, wherein the wakeup packet is a packet that causes the device to exit a power-saving mode.

12. The computer-readable storage medium of claim 10, wherein prior to receiving the request, the method comprises:
receiving a registration request from the device, wherein the registration request contains:
sufficient information to allow the sleep proxy to generate a wakeup packet that can wake up the device, and
a list of requests for which the sleep proxy can answer; and
adding the device to a list of devices for which the sleep proxy answers.

13. The computer-readable storage medium of claim 12, wherein the registration additionally contains a lease expiration time, wherein upon reaching the lease expiration time, the sleep proxy cancels the device registration.

14. The computer-readable storage medium of claim 13, wherein the device renews the registration with the sleep proxy before the registration expires.

15. The computer-readable storage medium of claim 10, wherein the method further comprises:
receiving a notification from the device that the device is entering a power-saving state; and
in response to the notification, configuring the sleep proxy to answer for the device.

16. The computer-readable storage medium of claim 10, wherein the method further comprises:
receiving a notification from the device that the device has exited a power-saving state; and
in response to the notification, configuring the sleep proxy not to answer for the device.

17. The computer-readable storage medium of claim 10, wherein the method further comprises implementing a second sleep proxy that duplicates the functionality of the sleep proxy for fault-tolerance purposes.

18. The computer-readable storage medium of claim 10, wherein sending a response to the request further comprises waiting a random period of time prior to sending the response, wherein waiting the random period of time facilitates duplicate answer suppression between sleep proxies.

19. An apparatus that implements a sleep proxy, comprising:
a receiving mechanism configured to receive a request at the sleep proxy for information pertaining to a service provided by a device;
a determination mechanism configured to determine if the device is a device for which the sleep proxy answers;
wherein the determination mechanism is additionally configured to determine if the request is a request which the sleep proxy can answer; and
a response mechanism configured to send a response to the request on behalf of the device if the device is a device for which the sleep proxy answers, and the request is a request that the sleep proxy can answer;
wherein, if the request is for a device for which the sleep proxy answers, but is not a request that the sleep proxy can answer, the response mechanism is further configured to:
buffer the request and pass the request to the device upon receiving a message to stop answering for the device.

20. The apparatus of claim 19, wherein the apparatus further comprises a wakeup mechanism configured to send a wakeup packet to the device that causes the device to exit a power-saving mode if the request is not a request for which the sleep proxy can answer.

21. The apparatus of claim 19, further comprising:
a registration mechanism configured to receive a registration request from the device, wherein the registration request contains:
sufficient information to allow the sleep proxy to generate a wakeup packet that can wake up the device, and
a list of requests for which the sleep proxy can answer; and
a list addition mechanism configured to add the device to a list of devices for which the sleep proxy answers.

22. The apparatus of claim 21, wherein the registration additionally contains a lease expiration time, and wherein the apparatus further comprises a cancellation mechanism that is configured to cancel the device registration upon reaching the lease expiration time.

23. The apparatus of claim 22, wherein the device renews the registration with the sleep proxy before the registration expires.

24. The apparatus of claim 19, further comprising:
a notification mechanism configured to receive a notification from the device that the device is entering a power-saving state; and a configuration mechanism configured to configure the sleep proxy to answer for the device in response to the notification.

25. The apparatus of claim 19, further comprising:
a notification mechanism configured to receive a notification from the device that the device has exited a power-saving state; and
a configuration mechanism configured to configure the sleep proxy not to answer for the device in response to the notification.

26. The apparatus of claim 19, further comprising a second sleep proxy that duplicates the functionality of the sleep proxy for fault-tolerance purposes.

27. The apparatus of claim 19, wherein the response mechanism is further configured to wait a random period of time prior to sending the response, wherein waiting the random period of time facilitates duplicate answer suppression between sleep proxies.

* * * * *